United States Patent [19]

Chu et al.

[11] Patent Number: 5,461,014
[45] Date of Patent: Oct. 24, 1995

[54] LEAD PEROVSKITE BASED CERAMIC COMPOSITIONS WITHOUT ANY FREE LEAD OXIDE

[75] Inventors: Mike S. Chu, Lewistown; Daniel C. Rose, Ransomville, both of N.Y.; John Bultitude, Banbury, United Kingdom

[73] Assignee: TAM Ceramics, Inc., Niagara Falls, N.Y.

[21] Appl. No.: 182,705

[22] Filed: Jan. 13, 1994

[51] Int. Cl.$^6$ ............ C04B 35/00; C04B 35/20; C04B 35/46

[52] U.S. Cl. ............ 501/135; 501/112; 501/121; 252/62.9

[58] Field of Search ............ 501/135, 112, 501/121; 252/62.9

[56] References Cited

U.S. PATENT DOCUMENTS

| | | | |
|---|---|---|---|
| 4,670,815 | 6/1987 | Alexander et al. | 501/136 |
| 5,011,803 | 4/1991 | Park et al. | 501/135 |
| 5,183,786 | 2/1993 | Gejima et al. | 501/135 |
| 5,262,368 | 11/1993 | Hood et al. | 501/135 |

FOREIGN PATENT DOCUMENTS

| | | | |
|---|---|---|---|
| 566116 | 10/1987 | Australia . | |
| 0213722 | 3/1987 | European Pat. Off. . | |
| 2736688 | 2/1979 | Germany | 501/135 |
| 2915409 | 10/1979 | Germany | 501/134 |
| 0119306 | 9/1980 | Japan | 501/135 |
| 2126575 | 3/1984 | United Kingdom . | |

OTHER PUBLICATIONS

International Publication No. WO 92/00930 of T. Beales et al. for "Sintering Aid," (Jan. 23, 1992).

*Primary Examiner*—David Brunsman
*Attorney, Agent, or Firm*—Watson, Cole, Grindle & Watson

[57] ABSTRACT

A ceramic composition which includes $Pb(Mg_{1/3}Nb_{2/3})O_3$ or the oxide precursors thereof, in admixture with barium copper oxide of the formula $BaCuO_2$ as a sinter aid therefor. The compositions do not contain any free lead oxide and have high dielectric constants, e.g. above 8000, and low loss factors, e.g. below 3%.

11 Claims, No Drawings

LEAD PEROVSKITE BASED CERAMIC COMPOSITIONS WITHOUT ANY FREE LEAD OXIDE

BACKGROUND OF THE INVENTION

The present invention relates to lead perovskite-based ceramic dielectric compositions with high dielectric constants (K), e.g., above about 8000; low dissipation (loss) factors (DF), e.g., below about 3%; ultra low sintering temperatures, e.g., below about 1050° C.; which may be sintered without any external atmosphere control and which contain no free lead oxide.

The high dielectric constants and low dissipation factors of the ceramic compositions of this invention make them suitable for the manufacture of multilayer ceramic capacitors, hereinafter called MLCs, having high capacitances and small physical sizes. With their ultra-low sintering temperatures, the ceramic compositions of the present invention are suitable for manufacturing MLCs utilizing metal internal electrodes of the lower melting point metals and their alloys, such as 70% Ag; 30% Pd, which are significantly cheaper than the noble metals commonly used for such electrodes. No external atmosphere control is required for these compositions so they are suitable for manufacturing MLCs with simple kiln equipment. Most significantly, because the compositions of the present invention do not contain free lead oxide, which is harmful by ingestion and inhalation, they are easier to handle and process. The ceramic compositions of this invention therefore enable the manufacture of high performance, high volume efficiency MLCs with simplified manufacturing processes and lower costs.

PRIOR ART

The most common materials for manufacturing MLCs are $BaTiO_3$, $SrTiO_3$ with added modifiers, such as $SrZrO_3$, $CaZrO_3$, $BaZrO_3$, $CaTiO_3$, etc. These materials have dielectric constants up to about 11,000. However, these materials must be fired at temperatures above 1250° C. Such high firing temperatures necessitate the use of expensive noble metals, such as Pt, Pd, Au or their alloys which have high melting points as the internal electrode material in order to avoid vaporisation or other loss of the electrode material during the firing process. With the ever increasing cost of the noble metals, the manufacturing cost of high capacitance MLCs, which employ many internal electrode layers, becomes prohibitive.

One prior art approach to lowering the firing temperatures of common ceramic compositions, useful for firing dielectric layers in MLCs, involves the use of fluxes, such as PbO; $Bi_2O_3$; ZnO; $B_2O_3$; and $SiO_2$. With this approach, firing temperatures below 1150° C., have been achieved so that less expensive electrode materials such as 70% Ag/30% Pd can be employed. However, these compositions have been found to have dielectric constants less than about 11,000 because the fluxes usually add a low dielectric constant phase to the ceramic dielectric system.

Another prior art approach involves firing ceramic compositions in a reducing atmosphere such as a $CO/CO_2$ mixture, so that less expensive base metal electrodes, such as Ni, can be used in MLCs. However, the dielectric constant of these compositions are also low, e.g., less than 6000. Also the ceramic composition and the firing conditions, such as temperature/atmosphere, must be controlled rigidly so as to prevent both the reduction of the ceramic oxides and the oxidation of the electrode metal compositions. In yet another prior art approach, ceramic compositions such as those discussed above are first fired without electrodes in a highly reducing atmosphere, such as an $N_2/H_2$ mixture, to promote semiconduction and large grain growth, e.g., to above 20 μm, in the ceramic material. The large semiconducting grains are then insulated by diffusion insulating oxides such as PbO; $Bi_2O_3$; $B_2O_3$ in a second air firing process. These compositions normally have very high dielectric constants, above 20,000. However, these compositions are mainly designed for the manufacture of ceramic disc or tubular capacitors useful with low working voltages. The use of these ceramic compositions in MLCs is not practical because the large grain size requires that each dielectric layer would have to be at least 60 μm thick to sustain the required working voltages. The advantage of the high dielectric constant is thus lost by this thickness limitation because with the current state of the art in MLC manufacturing, much smaller and better capacitors can be manufactured to achieve the same objective with dielectric materials having lower K, for example 11,000 but with thinner dielectric thickness, for example at 15 μm. This is possible because of their higher breakdown voltages (BDV); resistance×capacitance (RC) and insulation resistance (IR).

In another prior art approach, lead perovskite compounds, commonly known as relaxor compounds, such as $Pb(Fe_{1/2}Nb_{1/2})O_3$, $Pb(Fe_{2/3}W_{1/3})O_3$ have been used to prepare ceramic compositions having dielectric constants above 15,000. However, these compositions, when used in the manufacture of MLCs, have one or several of the following disadvantages:

(a) the dissipation factor is usually high.

(b) the insulation resistance is low especially at higher temperatures.

(c) the sintering temperature is not significantly below 1150° C.

(d) the composition often requires more than one lead perovskite compound and/or multiple dopant compounds and therefore is complicated and costly to manufacture.

(e) the composition requires sintering under a controlled lead vapour pressure in order to maintain its stoichiometry and the manufacturing cost is therefore high.

(f) the compositions often contain added free PbO so that they can be sintered in air without externally controlled lead vapour pressure, which results in emission of PbO vapour into the air and is harmful to human health and the environment.

The use of barium copper oxide as a sinter aid for alkaline earth metal titanates has been described in PCT Application WO92/00930, but the firing temperatures required were around 1100° C. and lead containing relaxor dielectrics such as $Pb(Mg_{1/3}Nb_{2/3})O_3$ were not included in such compositions.

SUMMARY OF THE INVENTION

Accordingly, the present invention provides in one aspect a ceramic composition which comprises $Pb(Mg_{1/3}Nb_{2/3})O_3$ or the oxide precursors thereof, in admixture with barium copper oxide of the formula $BaCuO_2$ as a sinter aid therefor.

In another aspect, the present invention provides a method of sintering $Pb(Mg_{1/3}Nb_{2/3})O_3$ or the oxide precursor thereof, which method comprises the use as a sintering aid of barium copper oxide of the formula $BaCuO_2$.

Free lead oxide is excluded from the composition required to produce the $Pb(Mg_{1/3}Nb_{2/3})O_3$ based dielectrics of the invention and thereby obviates the associated processing problems. Furthermore, in a preferred embodiment of this invention additions of $PbTiO_3$, $Pb(Zn_{1/3}Nb_{2/3})O_3$ or $Pb(Fe_{1/2}Nb_{1/2})O_3$ or their constituent oxides or oxide precursors may be made in order to shift the Curie peak temperature close to 25° C., thereby increasing K at this temperature into the range of from 12000 to 20500.

DETAILED DESCRIPTION OF THE INVENTION

The major component of the ceramic composition of the present invention is a base preparation of ceramic powder $Pb(Mg_{1/3}Nb_{2/3})O_3$ to which may be added Curie point shifters such as $PbTiO_3$, $Pb(Zn_{1/3}Nb_{2/3})O_3$ (PZN) or $Pb(Fe_{1/2}Nb_{1/2})O_3$ (PFN), or their constituent oxides or oxide precursors, which are calcined and processed such that the resulting powder does not contain free lead oxide. The compositional ranges of the components of the base ceramic preparation, expressed as the oxides, are lead oxide of about 54.0 weight percent, magnesium oxide of about 3.2 weight percent and niobium pentoxide of about 42.8 weight percent. To this Curie point shifters such as $PbTiO_3$, $Pb(Zn_{1/3}Nb_{2/3})O_3$ (PZN) or $Pb(Fe_{1/2}Nb_{1/2})O_3$ (PFN) may be added such that they represent from 0 to 20 weight percent of the major component.

The minor component of the ceramic composition of the present invention is barium copper oxide, the constituent oxide or oxide precursors of which act as sinter aid. The weight ratio of barium copper oxide to the major component is from about 0.0033 to 0.01.

The present invention also includes within its scope a sintered ceramic body which is substantially free of any lead oxide prepared by sintering $Pb(Mg_{1/3}Nb_{2/3})O_3$ or the oxide precursors thereof with a sintering aid which is barium copper oxide of the formula $BaCuO_2$.

The sintered ceramic body may include therein at least one Curie point shifter as described herein. The sintered ceramic body preferably has a dielectric constant of above 8000, more preferably above 10000, and a dissipation factor of below 3%, more preferably below 1%.

The present invention also includes within its scope a multilayer capacitor which comprises fired dielectric layers of a ceramic composition comprising $Pb(Mg_{1/3}Nb_{2/3})O_3$ or the oxide precursors thereof, in admixture with barium copper oxide of the formula $BaCuO_2$ as a sinter aid therefor and metal internal electrodes of metals or alloys having a melting point of below 1180° C.

The internal electrodes of the multilayer capacitor preferably comprise a silver palladium alloy, more preferably a 70% silver/30% palladium alloy or a 90% silver/10% palladium alloy. The dielectric layers in the multilayer capacitor preferably have a thickness of 0.001 inch or less.

EXAMPLES 1 TO 3 (COMPARATIVE)

Magnesium niobate ($MgNb_2O_6$) was prepared by calcining, from 950° C. to 1050° C. for 3 to 5 hours, a dried milled mixture of MgO and $Nb_2O_5$ so that no free precursor oxide was detected by X-ray diffraction. The magnesium niobate was subsequently milled with an appropriate amount of PbO and the resulting mixture calcined from 700° C. to 900° C. for 4 hours to give $Pb(Mg_{1/3}Nb_{2/3})O_3$.

To illustrate the properties of lead perovskite based ceramic compositions containing free lead oxide, $Pb_3O_4$, was added in amounts of 0.3 g, 0.9 g and 1.2 g to 30 g portions of $Pb(Mg_{1/3}Nb_{2/3})O_3$ by mixing in a high speed Spex paint mixture for 10 minutes with 10 to 15 ml of distilled water in each mixture. The resulting slurries were dried into cakes and ground with a mortar and pestle. A 2.4 ml portion of binder solution consisting of about 26 weight percent propylene glycol, 2 g weight percent distilled water and 48 weight percent corn syrup, was mixed into each of the powders using a mortar and pestle. These mixtures were then granulated by passing through a 40 mesh nylon screen. Discs about 1.27 cm diameter and a thickness of 0.1 to 0.15 cm were prepared from these mixtures using techniques well known in the art, i.e. uniaxially pressing in a stainless steel die at a pressure of 38000 lbs per square inch.

The discs were fired at 1000° C. for 3 hours on stabilised zirconia setters. Silver electrodes were painted onto the discs, after they had cooled, and then these were fired at 815° C. to sinter on the electrodes. The capacitance (C), dissipation factor (DF) and capacitance change with temperature (TC) versus capacitance at 25° C. were then measured with a Model ESI2110A capacitance bridge at a frequency of 1 kHz, from −55° C. to +125° C.

The dielectric constant (K) was calculated using the fundamental relationship $$C = (K\,K_0\,A) \div t$$

where
$K_0$ = permittivity of free space
A = area of disc face
t = disc thickness The properties of the discs prepared from each composition are given in Table 1 below.

TABLE 1

|  | Example 1 | Example 2 | Example 3 |
|---|---|---|---|
| K at 25° C. | 11214 | 11539 | 11615 |
| DF (%) at 25° C. | 0.364 | 0.340 | 0.407 |
| Density (g/cm$^3$) | 7.700 | 6.999 | 7.566 |
| TC (%) at temp. | | | |
| 125 | −74.2 | −74.6 | −75.4 |
| 105 | −66.8 | −67.9 | −68.8 |
| 85 | −56.4 | −57.9 | −58.8 |
| 65 | −41.8 | −43.3 | −44.1 |
| 45 | −22.7 | −23.6 | −24.2 |
| 25 | 0.0 | 0.0 | 0.0 |
| 20 | 5.8 | 6.8 | 6.3 |
| 10 | 21.6 | 21.4 | 21.3 |
| 0 | 31.6 | 31.9 | 33.0 |
| −10 | 23.7 | 25.0 | 24.9 |
| −20 | 0.4 | −2.1 | −5.6 |
| −30 | −17.8 | −21.3 | −22.3 |
| −40 | −39.7 | −40.0 | — |
| $Pb_3O_4$ (g) | 0.3 | 0.9 | 1.2 |

EXAMPLES 4 TO 6

Barium copper oxide was added in amounts of 0.1 g, 0.2 g and 0.3 g, respectively, to 30 g portions of $Pb(Mg_{1/3}Nb_{2/3})O_3$. Discs were prepared and the electrical properties measured from these mixtures after processing them in a similar way to Examples 1 to 3. The properties of the discs prepared from each composition are summarised in Table 2 below.

TABLE 2

|  | Example 4 | Example 5 | Example 6 |
|---|---|---|---|
| K at 25° C. | 9900 | 9017 | 8261 |
| DF (%) at 25° C. | 1.067 | 0.920 | 0.598 |
| Density (g/cm$_3$) | 7.701 | 7.764 | 7.688 |
| TC (%) | | | |

TABLE 2-continued

| at temp. | Example 4 | Example 5 | Example 6 |
|---|---|---|---|
| 125 | −71.3 | −71.0 | −67.5 |
| 105 | −64.0 | −63.5 | −60.2 |
| 85 | −53.7 | −53.1 | −49.8 |
| 65 | −39.8 | −39.2 | −36.2 |
| 45 | −22.0 | −21.3 | −19.6 |
| 25 | 0.0 | 0.0 | 0.0 |
| 20 | 6.8 | 5.2 | 5.9 |
| 10 | 20.3 | 17.8 | 17.4 |
| 0 | 29.7 | 27.8 | 27.0 |
| −10 | 32.9 | 34.2 | 36.0 |
| −20 | 19.2 | 30.4 | 37.2 |
| −30 | −3.8 | 12.9 | 29.3 |
| −40 | −32.7 | −18.3 | 3.6 |
| $BaCuO_2$(g) | 0.1 | 0.2 | 0.3 |

EXAMPLE 7 TO 14

Batches of the composition of Example 6 containing 0.3 g barium copper oxide per 30 g of $Pb(Mg_{1/3}Nb_{2/3})O_3$ were fired at temperatures in the range of from 920° C. to 1160° C. for 3 hours on stabilized zirconia setters. Discs were prepared and the electrical properties measured after processing in a manner similar to that of Examples 1 to 3. The properties of the discs prepared from each composition are summarised in Table 3 below.

EXAMPLES 15 TO 20

30 g batches of mixtures of $Pb(Mg_{1/3}Nb_{2/3})O_3$ (PMN) with 1.2 g or 2.4 g of the Curie point shifters $PbTiO_3$, $Pb(Zn_{1/3}Nb_{2/3})O_3$ (PZN) or $Pb(Fe_{1/2}Nb_{1/2})O_3$ (PFN) were prepared and 0.2 g of barium copper oxide added thereto. The compositions were then fired at 1000° C. for 3 hours on stabilised zirconia setters. Discs were prepared and the electrical properties measured after processing in a manner similar to that of Examples 1 to 3. The properties of the discs prepared from each composition are summarised in Table 4 below.

TABLE 3

|  | Ex 7 | Ex 8 | Ex 9 | Ex 10 | Ex 11 | Ex 12 | Ex 13 | Ex 14 |
|---|---|---|---|---|---|---|---|---|
| Firing temp °C. | 920 | 960 | 980 | 1000 | 1040 | 1080 | 1120 | 1160 |
| K at 25° C. | 7772 | 7748 | 7565 | 7403 | 7098 | 5155 | 4091 | 1851 |
| DF (%) @ 25° C. | 0.292 | 0.280 | 0.415 | 0.347 | 0.281 | 0.429 | 0.439 | 2.772 |
| Density (g/cm³) | 7.829 | 7.810 | 7.810 | 7.785 | 7.860 | 7.860 | 7.713 | 7.713 |
| TC (%) at temp |  |  |  |  |  |  |  |  |
| 125 | −67.4 | −67.9 | −68.3 | −67.5 | −66.8 | −59.4 | −54.2 | −42.9 |
| 105 | −60.5 | −61.2 | −59.9 | −59.5 | −58.6 | −51.1 | −46.4 | −36.5 |
| 85 | −50.0 | −49.5 | −49.0 | −48.4 | −47.6 | −40.5 | −36.7 | −28.7 |
| 65 | −36.3 | −35.9 | −34.8 | −34.5 | −34.2 | −28.8 | −25.3 | −19.3 |
| 45 | −19.3 | −19.0 | −18.5 | −18.5 | −18.1 | −14.2 | −12.2 | −9.7 |
| 25 | 0.0 | 0.0 | 0.0 | 0.0 | 0.0 | 0.0 | 0.0 | 0.0 |
| 20 | 5.1 | 5.1 | 6.1 | 5.6 | 4.7 | 3.5 | 2.7 | 3.5 |
| 10 | 16.2 | 15.9 | 15.3 | 14.1 | 12.5 | 9.9 | 8.5 | 21.1 |
| 0 | 28.3 | 27.3 | 26.4 | 25.4 | 22.0 | 18.0 | 16.7 | 85.9 |
| −10 | 38.5 | 37.4 | 37.6 | 36.6 | 31.4 | 41.7 | 32.5 | 132.2 |
| −20 | 39.3 | 38.7 | 38.2 | 37.6 | 34.7 | 36.4 | 28.7 | 79.9 |
| −30 | 18.3 | 19.5 | 22.9 | 26.1 | 27.4 | 26.6 | 25.6 | 41.5 |
| −40 | −2.8 | 1.1 | 3.5 | 5.7 | 8.2 | 8.9 | 12.2 | 20.6 |
| −55 | −26.4 | −27.6 | −33.0 | −35.7 | −32.4 | −19.2 | −9.8 | 1.6 |

TABLE 4

|  | Ex 15 | Ex 16 | Ex 17 | Ex 18 | Ex 19 | Ex 20 |
|---|---|---|---|---|---|---|
| K at 25° C. | 11340 | 11240 | 9171 | 9378 | 9477 | 10218 |
| DF (%) at 25° C. | 0.74 | 1.87 | 0.65 | 0.63 | 0.51 | 0.65 |
| TC (%) at temp |  |  |  |  |  |  |
| 125 | −71.9 | −64.6 | −70.8 | −70.2 | −71.4 | −71.5 |
| 105 | −62.0 | −50.4 | −62.3 | −62.0 | −63.3 | −63.2 |

TABLE 4-continued

|  | Ex 15 | Ex 16 | Ex 17 | Ex 18 | Ex 19 | Ex 20 |
|---|---|---|---|---|---|---|
| 85 | −49.7 | −32.9 | −51.3 | −50.6 | −52.1 | −52.3 |
| 65 | −33.6 | −13.8 | −36.4 | −35.6 | −37.6 | −38.1 |
| 45 | −16.0 | 0.7 | −18.9 | −18.7 | −20.1 | −20.2 |
| 25 | 0.0 | 0.0 | 0.0 | 0.0 | 0.0 | 0.0 |
| 20 | 2.7 | −4.9 | 5.2 | 4.5 | 5.6 | 5.2 |
| 10 | 7.1 | −14.3 | 17.1 | 16.0 | 17.9 | 18.3 |
| 0 | 5.9 | −25.9 | 28.0 | 26.0 | 28.7 | 26.9 |
| −10 | −6.1 | −37.8 | 33.0 | 26.4 | 32.6 | 26.9 |
| −20 | −21.8 | −48.0 | 22.7 | 11.1 | 21.3 | 10.5 |
| −30 | −34.8 | −56.4 | −0.6 | −12.9 | −0.7 | −14.1 |
| −40 | −45.3 | −62.9 | −25.0 | −33.6 | −26.1 | −35.3 |
| −55 | −60.2 | −71.8 | −48.0 | −54.1 | −48.6 | −51.4 |
| Density (g/cm$^3$) | 7.782 | 7.723 | 7.799 | 7.806 | 7.812 | 7.810 |
| PMN (g) | 28.8 | 27.6 | 28.8 | 27.6 | 28.8 | 27.6 |
| PbTiO$_3$ (g) | 1.2 | 2.4 |  |  |  |  |
| PZN (g) |  |  | 1.2 | 2.4 |  |  |
| PFN (g) |  |  |  |  | 1.2 | 2.4 |
| BaCuO$_2$ (g) | 0.2 | 0.2 | 0.2 | 0.2 | 0.2 | 0.2 |

EXAMPLES 21 AND 22

To 640 g of $Pb(Mg_{1/3}Nb_{2/3})O_3$ prepared according to Example 1 were added 160 g of $Pb(Zn_{1/3}Nb_{2/3})O_3$ (PZN) and 5.4 g of barium copper oxide. The mixture was ball milled for 4 hours with 4980 g yttria stabilised zirconia milling media with 800 cc of deionised water. The resulting slurry was dried and screened through a 40 mesh screen.

500 g of the resulting ceramic powder was charged into a ball mill with Burundum medium (US Stoneware Co.) together with 240 grams of a binder solution made by uniformly mixing and dissolving 186 grams dioctylphthalate, 90 grams Nuostable V-1444, 597 ml ethanol and 270 ml toluene, and 372 grams Butvar B-76 vinyl resin. (Nuostable V-1444 is an alkali ion free organic solvent dispersing agent available from Nuodex Co. Inc., New Jersey and Butvar B-76 is a binder comprising a mixture of polyvinyl butyral, polyvinyl alcohol and polyvinyl acetate available from Monsanto Corporation.)

This slurry was milled for 16 hours, discharged and filtered through a 44 micron screen. The slurry had a viscosity of about 1500 to 3000 centipoise and was then de-aired and cast, in accordance with standard techniques, into a tape with a thickness of 0.0015 ins. The tape was then converted into multilayer ceramic capacitors having 70 percent silver 30 percent palladium electrodes via conventional processes well known in the art. The capacitors were preheated to 260° C. in 48 hours to decompose and remove all organic binder additives, placed on stabilised zirconia setters and sintered at 960° C. and 1000° C. for 3 hours. The sintered capacitors had 10 active dielectric layers with dielectric thickness of 0.0009 in. Termination electrodes of DuPont silver paint No. 4822, which is a mixture of silver and glass frit in a binder, were applied at opposite ends of the multilayer capacitor to connect alternate electrode layers and these capacitors were fired at 815° C. in a tunnel kiln. The dielectric constant (K), dissipation factor (DF), insulation resistance (R) and capacitance (C) product (RC) at 25° C. and 85° C., and capacitance change with temperature (TC) were measured. The measurements were again performed from −55° C. to 125° C. The properties are given in Table 5 below.

TABLE 5

|  | Example 21 | Example 22 |
|---|---|---|
| Firing temp (°C.) | 960 | 1000 |
| Capacitance (nF) | 375.91 | 351.19 |
| % DF | 0.28 | 0.38 |
| K | 13202 | 12334 |
| IR @ 25° C. (ohm) | 2.58E + 11 | 2.06E + 11 |
| RC @ 25° C. (ohm-farad) | 9.70E + 04 | 7.23E + 04 |
| IR @ 85° C. (ohm) | 5.78E + 10 | 6.64E + 10 |
| RC @ 85° C. (ohm-farad) | 9.99E + 03 | 1.15E + 04 |
| BDV(VOLT) | 550 | 567 |
| TC (%) at temp |  |  |
| −55 | −70.10 | −61.95 |
| −40 | −56.55 | −40.68 |
| −30 | −26.25 | −18.19 |
| −10 | 21.57 | 21.81 |
| 0 | 27.06 | 23.60 |
| 10 | 17.69 | 14.57 |
| 20 | 5.09 | 4.29 |
| 25 | 0.00 | 0.00 |
| 45 | −19.96 | −17.06 |
| 65 | −39.33 | −34.71 |
| 85 | −54.02 | −50.89 |
| 105 | −64.82 | −62.96 |
| 125 | −73.09 | −71.25 |

EXAMPLES 23 AND 24

The procedure of Examples 21 and 22 was repeated, except that 160 g of $Pb(Fe_{1/2}Nb_{1/2})O_3$ was substituted for the PZN in the preparation of the ceramic powder.

A multilayer capacitor was prepared according to the method of Examples 21 and 22. The properties are given in Table 6 below.

TABLE 6

|  | Example 23 | Example 24 |
|---|---|---|
|  | 960 | 1000 |
| Capacitance (nF) | 514.59 | 496.94 |
| % DF | 0.46 | 0.44 |
| K | 18175 | 17552 |
| IR @ 25° C. (ohm) | 1.13E + 10 | 4.02E + 10 |
| RC @ 25° C. (ohm-Farad) | 5.81E + 03 | 2.00E + 04 |
| IR @ 85° C. (ohm) | 1.47E + 09 | 1.22E + 10 |
| RC @ 85° C. (ohm-Farad) | 2.93E + 02 | 2.43E + 03 |

TABLE 6-continued

|  | Example 23 | Example 24 |
|---|---|---|
| BDV(VOLT) | 604 | 557 |
| TC (%) at temp |  |  |
| −55 | −69.48 | −68.07 |
| −40 | −55.72 | −49.85 |
| −30 | −38.26 | −34.76 |
| −10 | 16.67 | 17.09 |
| 0 | 31.64 | 26.15 |
| 10 | 22.79 | 18.25 |
| 20 | 6.89 | 5.48 |
| 25 | 0.00 | 0.00 |
| 45 | −25.30 | −23.06 |
| 65 | −30.90 | −44.45 |
| 85 | −61.24 | −60.00 |
| 105 | −71.89 | −74.33 |
| 125 | −79.10 | −78.34 |

EXAMPLES 25 AND 26

The procedure of Examples 21 and 22 was repeated, except that 160 g of $PbTiO_3$ was substituted for the PZN in the preparation of the ceramic powder.

A multilayer capacitor was prepared according to the method of Examples 21 and 22. The properties are given in Table 7 below.

TABLE 7

|  | Example 25 | Example 26 |
|---|---|---|
| Firing temp (°C.) | 960 | 1000 |
| Capacitance (nF) | 435.46 | 388.25 |
| % DF | 0.68 | 0.76 |
| K | 19213 | 17129 |
| IR @ 25° C. (ohm) | 2.03E + 11 | 1.78E + 11 |
| RC @ 25° C. (ohm-Farad) | 8.84E + 04 | 6.91E + 04 |
| IR @ 85° C. (ohm) | 5.20E + 10 | 4.88E + 10 |
| RC @ 85° C. (ohm-Farad) | 9.75E + 03 | 8.76E + 03 |
| BDV(VOLT) | 582 | 580 |
| TC (%) at temp |  |  |
| −55 | −72.66 | −69.37 |
| −40 | −61.53 | −55.62 |
| −30 | −48.15 | −42.96 |
| −10 | −9.82 | −8.07 |
| 0 | 9.59 | 9.02 |
| 10 | 13.78 | 11.86 |
| 20 | 4.72 | 3.61 |
| 25 | 0.00 | 0.00 |
| 45 | −21.12 | −16.59 |
| 65 | −41.16 | −36.70 |
| 85 | −56.96 | −53.79 |
| 105 | −68.63 | −66.02 |
| 125 | −76.73 | −74.13 |

EXAMPLES 27 to 29

The procedure of Examples 21 and 22 was repeated except that 160 g of $PbTiO_3$ was substituted for the PZN in the preparation of the ceramic powder.

A multilayer capacitor was prepared according to the method of Examples 21 and 22, except that the internal electrodes were 90% silver/10% palladium alloy. The properties are given in Table 8 below.

TABLE 8

|  | Example 27 | Example 28 | Example 29 |
|---|---|---|---|
| Firing temp (°C.) | 860 | 920 | 980 |
| Capacitance (nF) | 471.36 | 438.12 | 378.73 |
| % DF | 0.74 | 0.65 | 0.68 |
| K | 17704 | 16456 | 14225 |
| IR @ 25° C. (ohm) | 1.89E + 11 | 1.99E + 11 | 1.24E + 11 |
| RC @ 25° C. (ohm-Farad) | 8.91E + 04 | 8.72E + 04 | 4.70E + 04 |
| IR @ 85° C. (ohm) | 3.14E + 10 | 2.60E + 10 | 2.58E + 10 |
| RC @ 85° C. (ohm-Farad) | 6.28E + 03 | 5.07E + 03 | 4.93E + 03 |
| BDV(VOLT) |  | 532 | 528 |
| TC (%) at temp. |  |  |  |
| −30 | −56.0 | −51.9 | −43.2 |
| −20 | −42.8 | −38.1 | −27.8 |
| −10 | 1.5 | 5.9 | −11.4 |
| 0 | 1.6 | 5.9 | 10.4 |
| 10 | 12.0 | 12.5 | 11.1 |
| 20 | 6.4 | 6.1 | 4.5 |
| 25 | 0.0 | 0.0 | 0.0 |
| 45 | −19.4 | −17.6 | −12.7 |
| 65 | −40.9 | −38.0 | −31.7 |
| 85 | −57.6 | −55.5 | −49.5 |

We claim:

1. A ceramic composition which comprises $Pb(Mg_{1/3}Nb_{2/3})O_3$ or the oxide precursors thereof, in admixture with barium copper oxide of the formula $BaCuO_2$ as a sinter aid therefor, wherein the weight ratio of the $BaCuO_2$ sinter aid to the $Pb(Mg_{1/3}Nb_{2/3})O_3$ or the oxide precursors thereof is from 0.0033 to 0.01:1.

2. A composition according to claim 1 which additionally comprises at least one Curie point shifter therein.

3. A composition according to claim 2 wherein the Curie point shifter is $PbTiO_3$, $Pb(Zn_{1/3}Nb_{2/3})O_3$ or $Pb(Fe_{1/2}Nb_{1/2})O_3$.

4. A composition as claimed in claim 2 wherein the Curie point shifter is included in a positive amount of up to 20% by weight based on the $Pb(Mg_{1/3}Nb_{2/3})O_3$ or the oxide precursors thereof.

5. A method of sintering $Pb(Mg_{1/3}Nb_{2/3})O_3$ or the oxide precursor thereof, which method comprises the use as a sintering aid of barium copper oxide in the formula $BaCuO_2$, wherein the weight ratio of the $BaCuO_2$ sintering aid to the $Pb(Mg_{1/3}Nb_{2/3})O_3$ or the oxide precursor thereof is from 0.0033 to 0.01:1.

6. A method according to claim 5 wherein the $Pb(Mg_{1/3}Nb_{2/3})O_3$, or the oxide precursors thereof, is sintered at a temperature of below 1050° C.

7. A method according to claim 5 wherein the $Pb(Mg_{1/3}Nb_{2/3})O_3$, or the oxide precursors thereof, additionally include at least one Curie point shifter therein.

8. A method according to claim 7 wherein the Curie point shifter is $PbTiO_3$, $Pb(Zn_{1/3}Nb_{2/3})O_3$ or $Pb(Fe_{1/2}Nb_{1/2})O_3$.

9. A sintered ceramic body which is substantially free of any lead oxide prepared by sintering $Pb(Mg_{1/3}Nb_{2/3})O_3$ or the oxide precursors with a sintering aid which is barium copper oxide of the formula $BaCuO_2$, wherein the weight ratio of the $BaCuO_2$ sintering aid to the $Pb(Mg_{1/3}Nb_{2/3})O_3$ or the oxide precursor thereof is from 0.0033 to 0.01:1.

10. A sintered ceramic body as claimed in claim 9 which includes at least one Curie point shifter therein.

11. A sintered ceramic body as claimed in claim 9 which has a dielectric constant of above 8000 and a dissipation factor of below 3%.

* * * * *